United States Patent
Read (10) Patent No.: US 6,931,308 B2
(45) Date of Patent: Aug. 16, 2005

(54) VIABLE ALTERNATIVE TO PRIVATE VEHICLES IN URBAN AREAS

(76) Inventor: Lewis C. Read, 6840 Pacific La., Annandale, VA (US) 22003

(*) Notice: Subject to any disclaimer, the term of this patent is extended or adjusted under 35 U.S.C. 154(b) by 0 days.

(21) Appl. No.: 10/390,329

(22) Filed: Mar. 17, 2003

(65) Prior Publication Data

US 2004/0024621 A1 Feb. 5, 2004

Related U.S. Application Data

(63) Continuation-in-part of application No. 09/958,659, filed on Oct. 12, 2001, now abandoned.

(51) Int. Cl.[7] ................................................ G05D 1/00
(52) U.S. Cl. .......................................................... 701/1
(58) Field of Search .......................... 701/1; 340/457.4, 340/988, 991, 932.2

(56) References Cited

U.S. PATENT DOCUMENTS

| | | | |
|---|---|---|---|
| 5,289,369 A | * 2/1994 | Hirshberg | 705/13 |
| 5,726,885 A | 3/1998 | Klein et al. | 364/423 |
| 5,812,070 A | * 9/1998 | Tagami et al. | 340/932.2 |
| 5,838,251 A | 11/1998 | Brinkmeyer et al. | 340/825.31 |
| 6,006,148 A | * 12/1999 | Strong | 701/33 |
| 6,253,980 B1 | 7/2001 | Murakami et al. | 224/510 |
| 6,453,298 B2 | 9/2002 | Murakami et al. | 708/8 |
| 2002/0022979 A1 | * 2/2002 | Whipp et al. | 705/5 |

FOREIGN PATENT DOCUMENTS

WO    WO 01/065492 A1    9/2001    .......... G07B/15/00

* cited by examiner

Primary Examiner—Yonel Beaulieu

(57) ABSTRACT

A system and method of use for a viable alternative to private vehicles in urban areas is described. The system may include a number of vehicles, a number of checkout locations employing different technology according to specific geographic features of the location and a central computer system operatively coupled to the checkout locations and the vehicles at these locations which actively monitors the use of the vehicles in real-time. The system also includes demand predicting software operatively coupled to the central computer and the checkout locations to determine vehicle accessibility and availability. The goal is to build a system capable of matching the private vehicle's high availability ratio of apparently ninety-nine percent or greater.

25 Claims, 8 Drawing Sheets

FIG. 4
OPERATIONAL DATABASE TABLES

400

LOCATION TABLE

| LOCATION ID | AVAILABLE CARS | DIRTY CARS | RESERVED CARS |
|---|---|---|---|

TRIP TABLE

| TRIP ID | CUSTOMER ID | START LOC ID | START TIME | STOP LOC ID | STOP TIME | CAR ID |
|---|---|---|---|---|---|---|

CUSTOMER TABLE

| CUSTOMER ID | HOME LOCATION ID | STATUS | PASSWORD | CAR ID | TRIP ID |
|---|---|---|---|---|---|

CAR TABLE

| CAR ID | CAR TYPE | STATUS | CURRENT LOCATION ID |
|---|---|---|---|

CAR QUEUE TABLE

| LOCATION ID | STATUS | CAR TYPE | QUEUE ID | CAR ID |
|---|---|---|---|---|

MESSENGER TABLE

| MESS ID | MESS TYPE | TRIP ID | CUSTOMER ID | CAR ID | START LOC | START TIME | STOP LOC ID | STOP TIME |
|---|---|---|---|---|---|---|---|---|

FIG 5.

TRIP HISTORY TABLES

CUSTOMER TRIP HISTORY TABLE
BY LOCATION,
DATE AND TRIP TYPE

| Customer ID | From Location | To Location | Date | Time In | Time Out | Week Day | Trip Type | Car Type |
|---|---|---|---|---|---|---|---|---|

CUSTOMER TRIP PROBABILITY TABLE
BY LOCATION,
DATE AND TRIP TYPE

| Customer ID | Location ID | Day of Week | Time Out | Trip Type | Car Type | Probability | Variance |
|---|---|---|---|---|---|---|---|

AVERAGE TIME STAYED TABLE
BY CUSTOMER,
LOCATION AND TRIP TYPE

| Customer ID | Location ID | Location Type | Average Time Stayed | Trip Type | Variance |
|---|---|---|---|---|---|

AVERAGE TRAVEL TIME TABLE
BY LOCATION, MONTH OF YEAR,
DAY OF WEEK, HOUR OF DAY

| From Location | To Location | Month of Year | Day of Week | Hour of Day | Car Type | Travel Time |
|---|---|---|---|---|---|---|

FIG 6.

DEMAND ESTIMATING TABLES

CUSTOMER'S CURRENT LOCATION TABLE

| Location ID | Customer ID | Location Type | Time In | Estimated Time Out | Date | Probability | Car Type |
|---|---|---|---|---|---|---|---|

TOTAL DEMAND
BY LOCATION BY DATE, CAR TYPE, TRIP TYPE AND TIME PERIOD

| Location ID | Total Demand | Date | Time Period | Trip Type | Car Type | Probability | Variance |
|---|---|---|---|---|---|---|---|

CUSTOMERS PREDICTED TIME TO GET TO A LOCATION
BY DATE AND CAR TYPE

| Location ID | Customer ID | Date | Projected Time In | Car Type | Probability | Variance |
|---|---|---|---|---|---|---|

TOTAL VEHICLES AT A LOCATION
BY CAR TYPE

| Location ID | Total Vehicles | Car Type | Status |
|---|---|---|---|

TOTAL VEHICLES NEEDED AT A LOCATION
BY DATE, TIME PERIOD AND CAR TYPE

| Location ID | Total Vehicles Needed | Date | Time Period | Car Type | Probability | Variance |
|---|---|---|---|---|---|---|

TOTAL VEHICLES PREDICTED TO BE AT A LOCATION
BY DATE AND CAR TYPE

| Location ID | Total Vehicles Predicted | Date | Time Period | Car Type | Probability | Variance |
|---|---|---|---|---|---|---|

VIABLE ALTERNATIVE TO PRIVATE VEHICLES IN URBAN AREAS

CROSS-REFERENCE TO RELATED APPLICATIONS

The present invention is a continuation-in-part of, and claims priority under 35 U.S.C. § 120 from U.S. patent application Ser. No. 09/958,659 filed on Oct. 12, 2001 now abandoned. The disclosure of this application is specifically incorporated by reference herein and for all purposes.

TECHNICAL FIELD OF THE INVENTION

The present invention relates to a general method and apparatus for building a new type of shared-vehicle system that could be a viable alternative to private vehicles across vast urban regions and eliminate the problems associated with private vehicles while preserving their freedom and dependability.

BACKGROUND AND SUMMARY

The private vehicle has changed the urban world. It offers its owners the freedom to travel whenever they want and it is easily accessible from an almost limitless number of locations throughout an urban area, and it has a high availability/reliability ratio, approximately 99.9%. However, the cost of owning a private vehicle has increased at a significantly higher rate than the median income. Moreover, the increase in the rate of vehicle ownership has increased traffic and parking congestion in urban areas. Standard ownership methods are leasing and purchasing. For the urban-dweller, this equates to ownership costs that are continuous for a vehicle that is actually used a small fraction of that of the suburban or rural vehicle owner, who relies on the vehicle on a daily basis. Furthermore this type of ownership has almost wiped out other modes of urban transportation because they cannot compete against the private vehicle's much lower incremental costs.

While the use of vehicles for hire is an alternative to the urban-dweller, there are drawbacks associated with known options as well. For example, the rental and livery industries are certainly available to the urban dweller. However, these are usually exceedingly expensive and not practical for at least this reason. Moreover, while car-sharing methods are known, these known methods do not provide the needed substantial certainty of availability, nor convenience needed. For example known car-sharing systems are operate essentially using to the same basic principal as conventional car renting. If a vehicle is available, they will rent it to you. There is never any implication that you will always find a car.

In addition, known car-sharing methods require vehicles to be moved for a significant portion of total vehicle use. Clearly, this is less than desirable, requiring excessive manpower, and inconvenience to the customer, who must wait for a vehicle to be delivered, in essence. In order to build a system that improves car-sharing, efficient demand estimation is required, so vehicles are available to the customer without significant waiting and with having rarely to relocate the vehicles.

What is needed is a method and system that will provide effectively all of the features and advantages of a vehicle ownership such as freedom of use, dependability and accessibility; and at the same time eliminate substantially all of the problems, such as high costs in conventional vehicle ownership, rental and leasing, as well as and urban congestion. Advantageously, such a method and system is implemented in a way that will complement other modes and will let a person take whatever mode that best suits his or her needs at the time without being penalized with the high overhead of private vehicle usage.

It is an object to provide a system that predicts and anticipates vehicle demand and have a vehicle waiting for a customer without the customer's having to make a reservation. It is also an object to provide a system that could economically let a user check-out a car from an almost limitless number of locations throughout a city. These locations could be city streets, parking lots and both attended and unattended parking garages. The trips provided by this system could be single one-way trips between any two locations, such as the morning trip to the workplace. These trips could also be round trips to and from the same location, like weekend trips to Grandma's house or quick trips to the drug store. An objective of the system and method of the present invention is to offer the same freedom and dependability of a private vehicle and to let a person perform the same type of urban driving done in a private vehicle but through a car sharing operation; and to do this over an entire urban region so that the greatest number of people can more economically use mass transit and thereby reduce urban traffic congestion.

To accomplish these and other objects according to an exemplary embodiment of the present invention an automated car sharing system includes an automated checkout unit, which is operatively coupled to at least one vehicle, and a central control center that performs control and monitoring functions. The automated checkout unit is responsive to a customer request and is adapted enable at least one vehicle for use by a customer.

To further accomplish these and other objects according to an exemplary embodiment of the present invention the system and method of the present invention contain a demand prediction model capable of adapting to the dynamic nature of urban vehicle travel and thereby enabling the system to offer a customer substantial certainty (e.g., approximately 99% or greater) of finding a car. To further accomplish these and other objects according to an exemplary embodiment of the present invention limits and controls have to be maintained on the service offering.

BRIEF DESCRIPTION OF THE DRAWINGS

The invention is best understood from the following detailed description when read with the accompanying drawing figures. It is emphasized that the various features are not necessarily drawn to scale. In fact, the dimensions may be arbitrarily increased or decreased for clarity of discussion.

DETAILED DESCRIPTION OF THE DRAWINGS

In the following detailed description, for purposes of explanation and not limitation, exemplary embodiments disclosing specific details are set forth in order to provide a thorough understanding of the present invention. However, it will be apparent to one having ordinary skill in the art having had the benefit of the present disclosure, that the present invention may be practiced in other embodiments that depart from the specific details disclosed herein. Moreover, descriptions of well-known devices, methods and materials may be omitted so as to not obscure the description of the present invention.

Briefly, the invention is drawn to a method and apparatus for enabling authorized users to share a plurality of vehicles located at numerous of locations throughout an urban setting. These locations are illustratively in one of two categories, either a specific site like a parking garage, or a zone like a neighborhood or a large parking area such as those surrounding shopping centers. Trips in this system can be either single or one-way trips between any two of these locations like the morning trip to work, or round trips to and from the same location like the weekend trip to a relative or the quick trip to the grocery store. The technology used to checkout a vehicle depends upon the nature of the location. Specific sites such as garages will use the kiosk facility; and zones will use the unit attached to the vehicle. The urban area served by the system is made up of numerous contiguous locations or cells. As will become clearer as the present description continues, the method and apparatus of the exemplary embodiments of the present invention offer a user the same type driving flexibility associated with a private vehicle and allow the user to go from one type of cell to another with relative ease.

Figure 1:
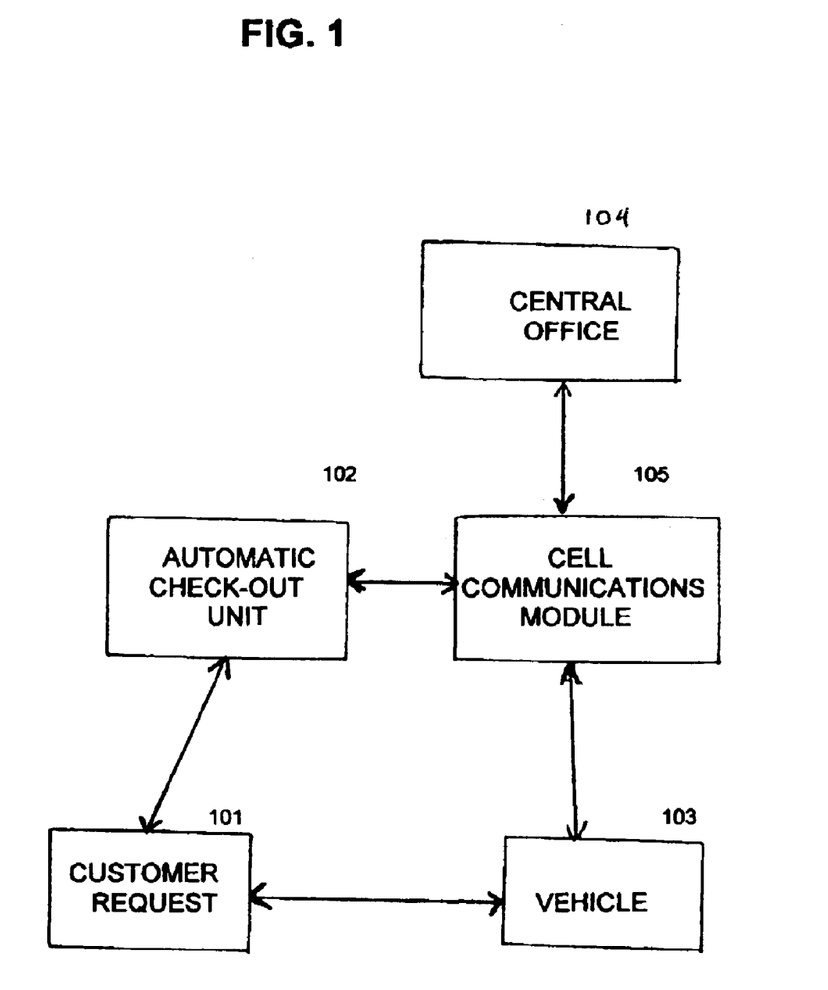
FIG. 1 is a functional block diagram of the public access automobile system according to an illustrative embodiment of the present invention.

Turning to FIG. 1, a system overview according to an illustrative embodiment of the present invention is disclosed. An authorized user placing a request with the automatic checkout unit 102 affects a customer request 101 in the illustrative embodiment. The automatic checkout unit 102 may be a freestanding device, or kiosk, such as an automated teller machine. However, it is clear that other types of user interfaces are possible, for example an on-line website interface. In the illustrative embodiment in which the automatic checkout unit 102 is a freestanding device such as an automated teller machine (ATM), the user would insert an identification card into a card reader, such as a magnetic card reader, which is disposed in the automatic checkout unit 102.

The automatic checkout unit 102 may then request a validation number to be input to an alphanumeric keypad on the automatic checkout unit 102. The automatic checkout unit 102 will verify the particular user's validation information, against stored data in an illustrative on-site database. After this check, the customer will be prompted by the automated checkout unit 102 to select a particular type of vehicle. The computer will then check to see the availability of the vehicle, a may perform other tasks at this point as well. For example, the computer may check to see if the customer's account has a zero-balance before authorizing further use.

Upon satisfactory completion of the availability and balance check, the automatic checkout unit 102 will send a message to the Cell Communications Module 105 which handles communications between the Automatic Check-Out Unit 102 and the vehicles in the cell and between the central office and the Automatic Check-Out Unit. The Cell Communications Module 105 will in turn send a message to the control unit in a vehicle 103 authorizing its use by the particular user. At this point, the message from the automatic checkout unit 102 will instruct a control unit within the vehicle 103 to unlock the doors and enable the ignition. Suitable instructions will then be given by the automatic checkout unit 102 to the user as to the location of the vehicle. It is anticipated that this process will take on the order of approximately 15 to approximately 20 seconds in total.

Another illustrative embodiment of the present invention disclosed is for a customer request by an authorized user to be placed directly with the vehicle control unit. In this embodiment the user would identify his membership into the system through an electronic medium/device and a reader of that medium/device, such as touch memories and other 1-Wire devices. These devices are high-capacity, general-purpose data carriers, each of which has a unique registration number that acts as a general identification number. An example of these devices is the iButton and iButton reader developed by Dallas Semiconductor, Inc. The iButton device and reader is merely illustrative.

The vehicle control unit in the vehicle would check its database to see if the number on the touch memory device matched a user in the database. It would also check to see if its current status was such that it was available for hire. If both of these were in order and if the customer further identified himself by some other form of identification, pin number, finger print or voice recognition means done either inside or outside the vehicle, the vehicle control unit would allow the customer to operate the vehicle and then send a new trip message to that effect to the Cell Communications Unit 105.

In the illustrative embodiment of FIG. 1, the automatic checkout unit 102 may be a freestanding device or a device in part of a central website. Each automated checkout unit will have its own database and its own control system, for example a computer. Consequently, each automatic checkout unit 102 will be self-contained with all necessary information required for a customer to checkout a vehicle for personal use. As a result, the response time between the entry of the validation number of the customer and his/her approval is significantly reduced on compared to conventional shared vehicle systems, for example automobile rental systems.

In the illustrative embodiment of FIG. 1, the automobile control unit in the vehicle 103 illustratively includes its own database and its own control system, for example a microcomputer. Consequently, each automobile control unit will be self-contained with all necessary information required for a customer to checkout a vehicle for personal use. As such, the response time between the entry of the validation number of the customer and his/her approval is significantly reduced as compared to other shared vehicle systems or conventional automobile rental systems.

In the illustrative embodiment shown in FIG. 1, the cell communications unit 105 may be in communication with a central office 104, which has a central computer system at a headquarters site, for example. The cell communications unit 105 may be in continuous communication with central office 104 via conventional phone lines, or other known data communication and telecommunications media and techniques. The initiation of a trip by a particular user along with other types of transactions may be relayed from the automatic checkout unit 102 or from the vehicle control unit 103 via the cell communications unit 105 to the central computer database at the central office 104. This may be for the purposes of updating the central office 104 databases. The central computer of the central office 104 may have individual computer terminals showing the number and status of vehicles at various sites within the overall system. To this end, the central office 104 may be connected to a plurality of cell communications units 105 (not shown in plural) in various locations in a particular urban location, or a plurality of urban locations throughout a region. Computer programs within the central computer will monitor the flow of cars and signal operators when a particular action has to be carried out, such as moving a particular vehicle to a particular location. The operators will pass this information on to service personnel at the user's sites through either a computer network or other communication techniques, such as bi-cellular telephone. Further details of the automated checkout unit 102, the central computer of the central office 104, and the cell communications module 105 are described in further detail in illustrative embodiments herein below.

In the illustrative embodiment of FIG. 1, the cell communications module 105 may be a freestanding device or exist in partnership with the automated checkout unit 102. It may have its own database and its own control system or again it may share these with the automated checkout unit 102.

Figure 2:
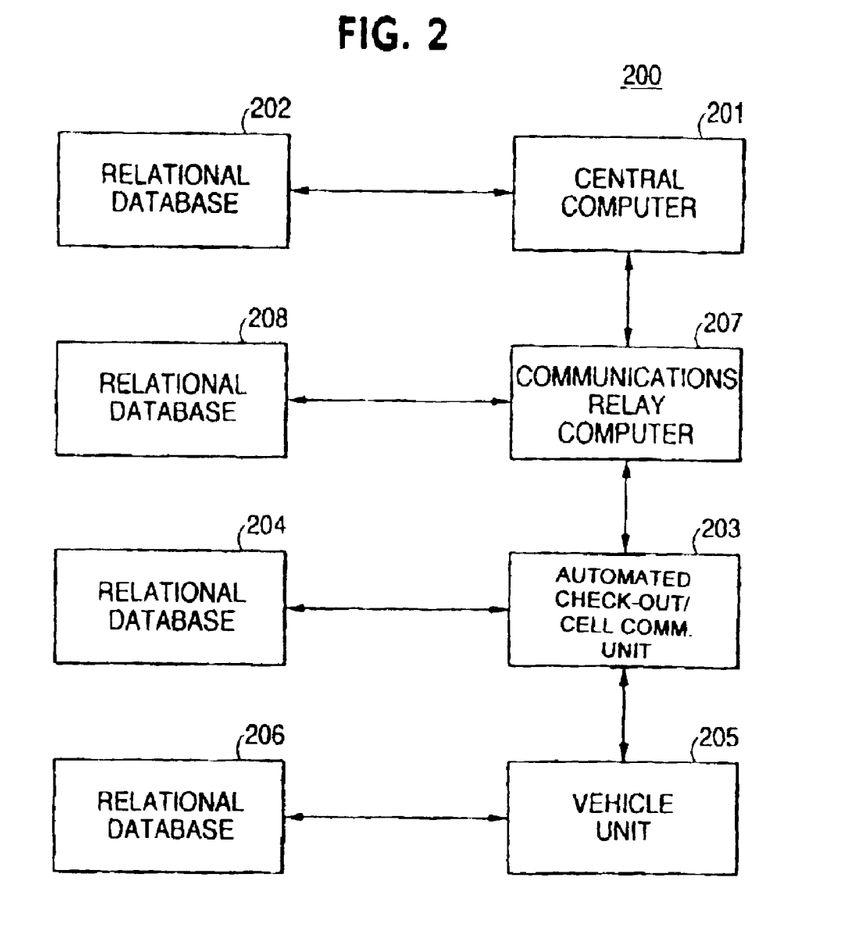
FIG. 2 is a functional block diagram of the central computer, automated checkout unit/cell communication module combination, vehicle and related databases according to an illustrative embodiment of the present invention.
Figure 2A:
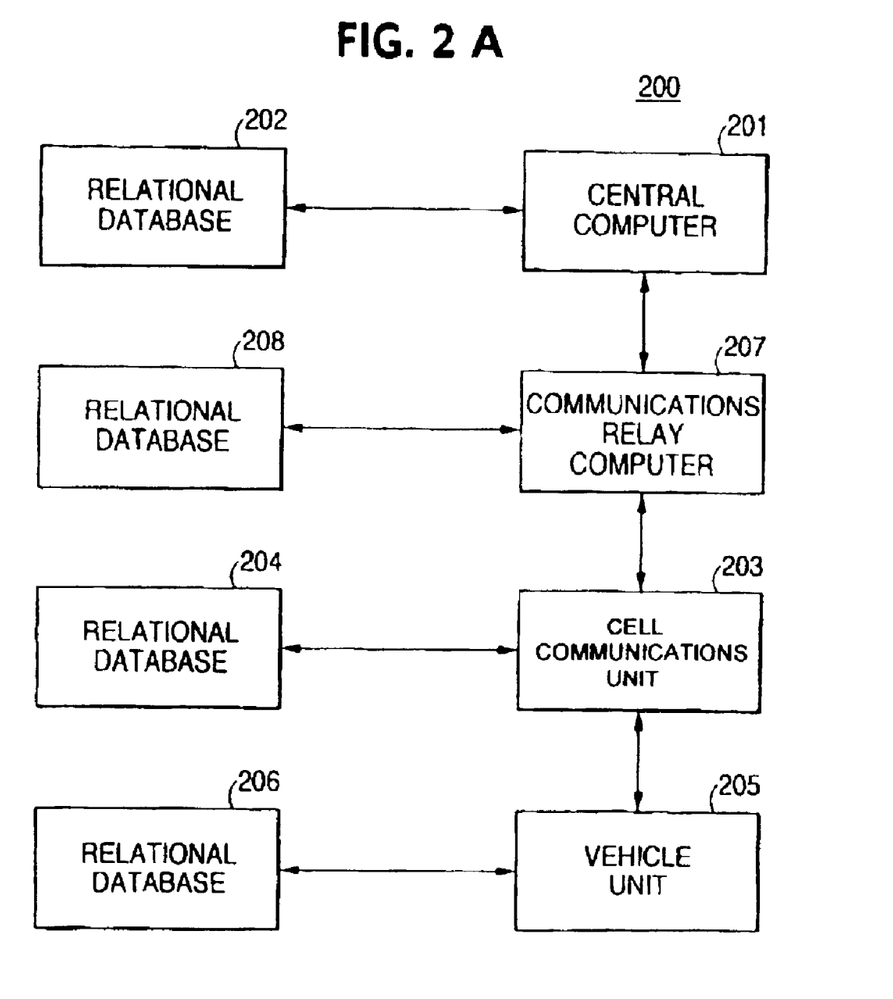
FIG. 2A is a functional block diagram of the central computer, cell communication unit, vehicle and related databases according to an illustrative embodiment of the present invention.

Turning to FIGS. 2 and 2A, a central computer system 200 according to exemplary embodiments of the present invention are shown in functional block diagram form. The central computer system 200 has the useful function of insuring that users will always have access to an automobile. To effect this, the central computer 201 has monitoring program, which constantly monitors automobile activity. The central computer system 200 will show the location of all available cars, as well as project automobile demand by car type on a period basis, for example an hour-by-hour basis. Moreover, the central computer system 200 also will show the actual ingress and egress of vehicles, and will compare the number of vehicles available with the projected demand of vehicles. These projections along with actual vehicle trip records are recorded in relational database 202. According to an illustrative embodiment, company personnel, for example in central office 104, monitor the cars available and the projected ingress of vehicles versus the projected demand on a real-time basis. This will prompt the personnel to take active steps to move vehicles from one location to another to assure a suitable supply of vehicles based on projected demand at each particular location.

The relational database 202 is a useful element in the central computer system 200. The relational database 202 provides a technique of organizing related data in a tabular form. The tables may be groups of records with a similar record format. This format may consist of individual data fields to store individual pieces of data such as an individual's ID number, trip type, start time, start location ID, etc. Each record in a table has a unique identifier.

One useful feature of the central computer system 200 is that the relational database 202 will be a unique type of relational database. To this end, it is a distributed database. The primary relational database is relational database 202, being located at location of the central computer 201. However, there is a subset of primary databases. For example, there will be a subset of primary databases in each of the automated checkout units 203. As can be seen in FIGS. 2 and 2A, each automated checkout unit/cell communications module 203 has its own relational database 204. Additionally, there may even be a smaller subset of relational databases in each vehicle. As can be seen in FIGS. 2 and 2A, each vehicle 205 has a relational database 206, which is illustratively a subset of the relational database 202. The distributed nature of the relational databases 202, 204 and 206, respectively, is particularly advantageous from the perspective of speed. In the case of the automated checkout unit/cell communications module 203, each unit will have stored therein all necessary information to allow a particular user to checkout a vehicle.

Besides making the checkout time very short, this strategic redundancy also fosters a more robust central computer system. If, for some reason, the central computer 201 is out of communication with an automated checkout unit/cell communications module 203, the automated checkout unit/cell communications module 203 having a relational database 204 may continue to function for a period of time, illustratively a number of hours. Moreover, for purposes of reliability, it may be useful to incorporate an uninterruptible power supply for each active component of the central computer system 200.

Accordingly, potential problems due to power failures can be mitigated to a great extent according to the illustrative embodiment shown in FIG. 2. For example, if one automated checkout unit/cell communications module 203 fails due to a power outage, other checkout units may continue to function. The intent of this design is to make the availability of the vehicles as dependable as possible and to reduce the impact of such factors as power, communications or computer failures on this availability.

Figure 3:
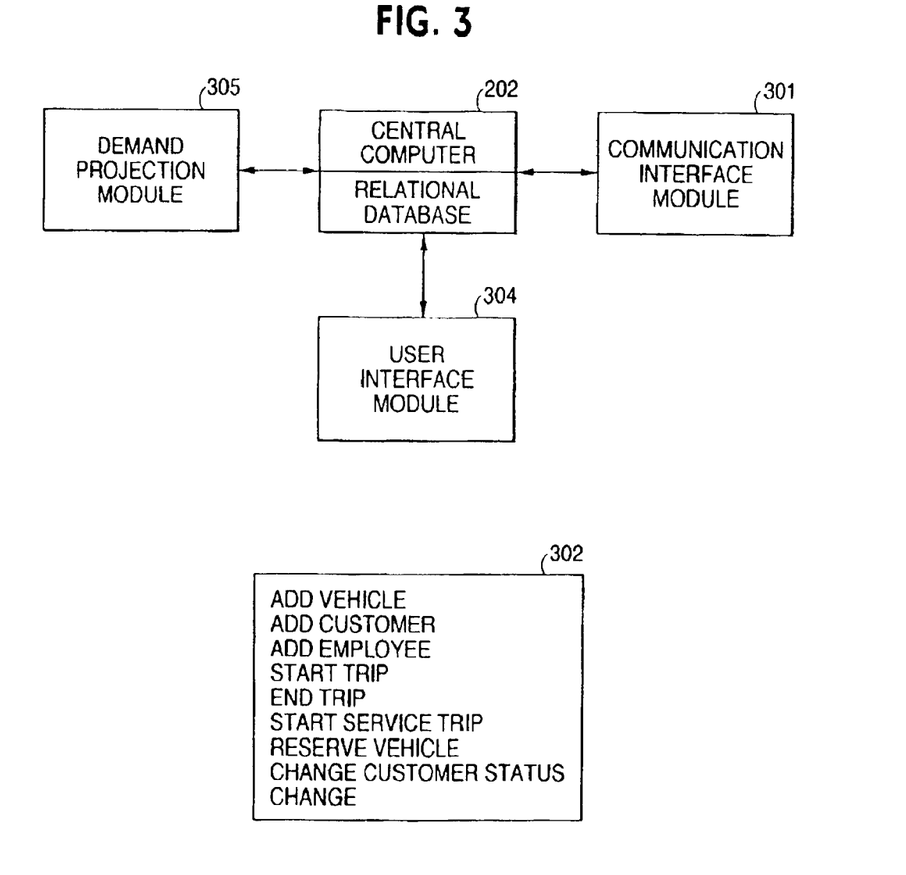
FIG. 3 is a functional block diagram of the interaction of various software modules with hardware units according to an illustrative embodiment of the present invention.
Figure 3A:
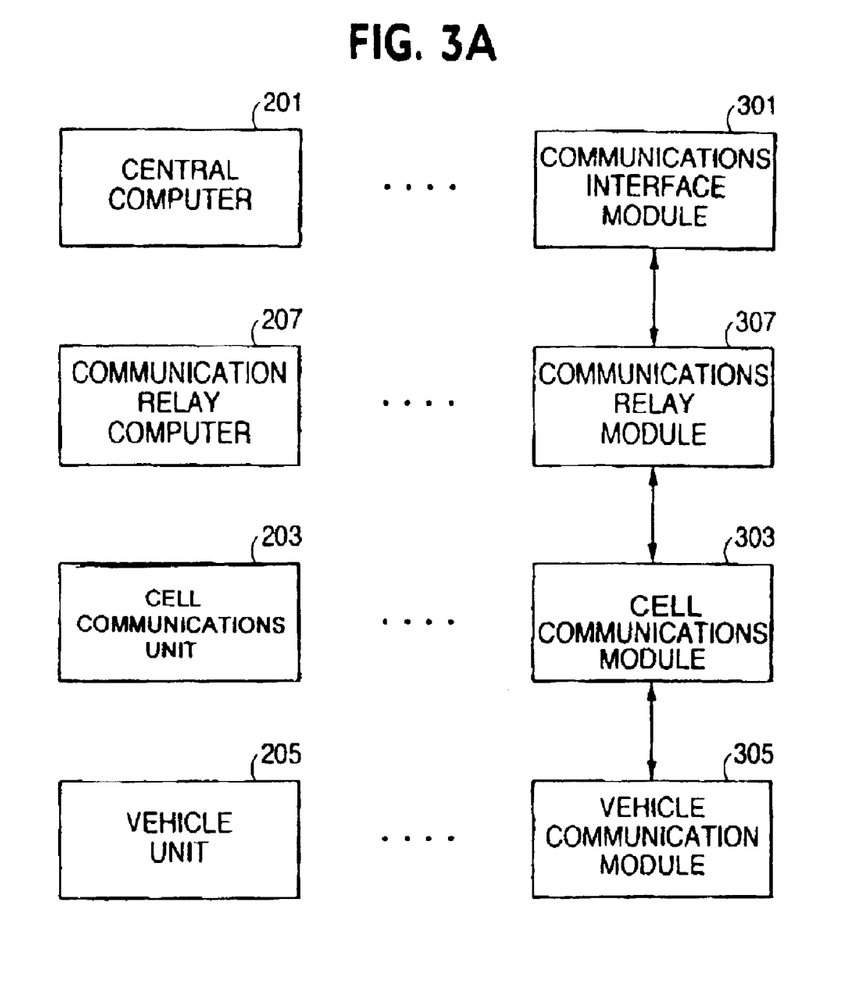
FIG. 3A is a functional block diagram of the interaction of various software modules with hardware units according to an illustrative embodiment of the present invention.

Supporting the central computer system 200 are a number of software modules, referred to herein as the central computer system software modules. Illustratively, the software for the central computer system 200 may be divided into three parts: A communications interface module, a user interface module and a demand projection module. Turning to FIGS. 3 and 3A, functional block diagrams of illustrative central computer system software modules are shown.

The communications interface module 301 links the central computer system 200 together. The central computer 201 is linked to an automated checkout unit 203 via the communications relay computer 207. Each of these computers contains a corresponding software module. The central computer's module is 301. It sends and receives a single transaction to the communications relay module 307 in the relay computer 207. This unit in turn sends the message to all of the cell communications modules 203. This message is received by the cell communications modules 303 and it in turn sends it to the vehicle units 205 where it is received by the vehicle's communications module The communication interface 301 effects the all transactions within the central computer system 200. These transactions are distributed through the entire central computer system 200 by way of the communication interface module 301. For example, if a new customer is added by the central computer system 200, a record is added within the central computer system 200 and a transaction is sent to each of the automated check-out units via the cell communications module to add a record to their individual relational databases 204. This transactional invent is effected by the communications interface module 301. It sends a message to the communications relay unit 207. This unit adds a new message record to its database 208 for each cell communications module/automated checkout unit 203 it communicates with. After each 203 unit has processed the message and sent back an acknowledgement the communications module 307 updates its database 208. In the automated checkout units 203, the record illustratively contains less information than is recorded in the central computer 201. By virtue of the communications interface 301 the cell communications modules 203 will send messages to each vehicle at its particular site (within its database) adding a customer record to each relational database 206 of each vehicle 205. This information (record) may then be used to validate future communications with a particular vehicle. Moreover, the vehicle communications interface module 306 will assign an identifying number to each vehicle, and will change the identifying number in prescribed manner after each transaction throughout the day. Consequently, according to an illustrative embodiment of the present invention, each transaction between a vehicle 205 and a cell communications module 203 will be unique by virtue of the communications interface module 301. This provides an added measure of safety, as a would-be thief having intercepted a transaction would not be able to rely on the identifying information at a later point in the day The above description of the communications interface module is merely illustrative, and it is of interest to note that other functions may be effected by the communications interface module 301. For example, when a customer/user checks out a vehicle, the automated checkout unit/cell communications modules 203 sends a transaction to the central computer 201 to inform them of the event. This signal is intercepted by the relay module and sent to all the other cell communications modules/check-out units in the system. In this way if a user goes to another check-out unit, that unit knows the user's status and which vehicle he is using and the check-in process can take place. An overall purpose of the communications interface module 301 is to keep the various relational databases coordinated. All of the transactions are uniquely identified by the communications interface module 301. If, for example some transactions are overlooked for whatever reason, for example a power outage, when a particular computer (either in the automated checkout unit/cell communications module 203 or the central computer 201) is functional once again, the transactions are resent to the computer so that it could get back in coordination with all of the other units within the central computer system 200. Other illustrations of transactions, which are communicated by the communications interface are shown in FIG. 3 in block 302. Clearly the types of transactions listed in block 302 of FIG. 3 are merely illustrative, and other possible types of transactions may be effected by software of the communications interface module 301.

Another useful software module incorporated into the illustrative embodiment of FIG. 3 is a user interface module 304. The user interface module 304 effects the monitoring of the central computer systems 200 by personnel in the central office 104. The user interface module 304 also may be used to show the actual ingress and egress of vehicles and will compare the numbers of vehicles on-hand at each site with projected demand. These projections of demand along with actual vehicle trip records will be recorded within the central computer relational database 202. Company employees will be able to monitor the vehicles on-hand as well as the projected in-flow versus the projected demand on a real-time basis by virtue of the user interface module 304. This fosters the ability to take action with foresight and relocate vehicle from places where demand may be light to locations where demand may be heavy.

The central computer system 200 may also do administrative functions, such as add new customers and employees to the system. This is effected through the action by employees at the central office 104 and the transactions are effected through the coordinated software of the user interface module 304 and the communications interface module 301. Additionally, and again for purposes of illustration, price changes may be effected and changes to customer status may be effected as well through the central office input via the user interface module 304 and its coordination with the communications interface module 301. The central computer system's billing process and management reports to evaluate operation will be effected through the user interface module 304 and are a few of the types of activities that will not be sent to the communications interface module 301. These activities will be confined to the central computer 201.

Finally, a viable alternative to the private vehicle requires an availability approaching 100% and a waiting time approaching zero. To wit, people wait for taxis and buses. People don't wait for their private cars. To meet this need, the method and apparatus of the present invention includes an accurate demand-estimating model. This demand estimating model captures demand history at the individual customer level and calculates demand estimates on an individual customer basis. Some trips like those to the workplace are very predictable; people tend to go to and from work at the same time each day. Other trips are at random; sometimes people go to one restaurant, sometimes another. Consequently, member demand estimates of the demand estimating model have some numbers that have an almost 100% probability and some numbers with a lower probability. It is necessary to be able to separate those numbers out and accumulate the results in real-time.

Also, the demand-estimating model must be adaptable to the dynamic nature of vehicle demand. The demand in some areas is affected by the number of trips into that area. If the number of vehicles that went to a football game is known, the number of vehicles that will leave is relatively easily obtained. If it is known that some people like coaches and players have a history of staying longer after a game, then the fact that the demand for vehicles in that area isn't over until these people leave is also known. In summary, to build a system that offers a high availability the method and apparatus of the present invention develops and maintains a history of the travel patterns of the users of the system and is adaptive to the usual fluctuations that are a normal part of urban travel.

The standard method for making demand projections is to base them upon historical records. These records may then be summarized into summary records, which give daily trip totals by location, vehicle type and time of day and by day of the week. These summary records may be calculated by various demand categories, for example the mean number of trips leaving a particular location between a certain time on a certain day in a particular vehicle type. These statistical means may then be calculated for summary records over a 90-day period and variances and standard deviation may also be determined. The problem associated with this type of approach is that it's very inflexible. For example, if ten people always check-out a car from a particular site every weekday morning for a period of time, this method is going to predict that ten cars will be needed next morning regardless of the fact that two of these people have already checked-out cars the day before and are our of town. A summary based system just looks at past history and makes an estimate from there. Another example will help clarify this issue. If one-hundred vehicles are historically used to take people to work in an area then a summary prediction model will predict that one-hundred vehicles will be needed to take people home. This does not account for the fact that on a particular day maybe only ninety vehicles when into the area. As such the method and apparatus of the present invention includes an adaptive model that takes into account the current real-time actions of its customers.

Figure 4:
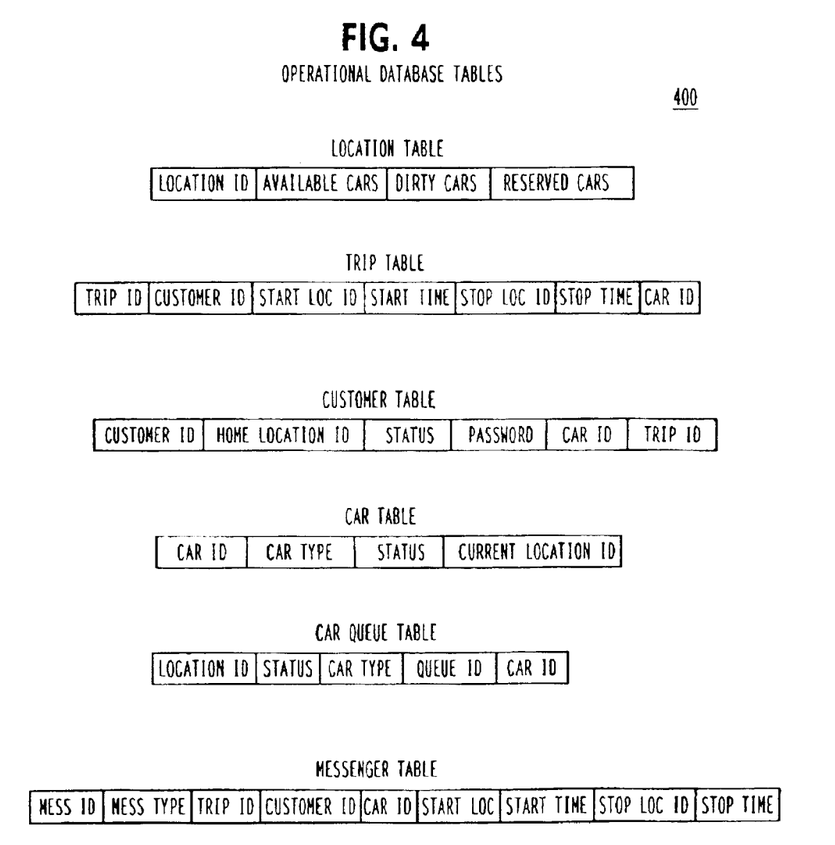
FIG. 4 shows the operational database tables according to an illustrative embodiment of the present invention.

An exemplary embodiment of the present invention builds a more adaptive and accurate prediction model by first defining the operational database tables. Tables in accordance with exemplary embodiments of the present invention are shown in FIG. 4 and may be used within the central computer system 200. The operational database tables 400 may be used to incorporate data, which may be used to define locations served, customer, vehicles, vehicle types, status and the present location of vehicles. The operational part of the database tables 400 contains a record of each trip. Each trip record has a start and stop time of every trip, with start and stop locations, customer ID number, vehicle ID number, etc. These are shown, in the various tables of the operational database tables 400 of FIG. 4. The operational tables are found in the 202, 204 and 206 relational databases. The 208 relational database is a message processing database. It will contain the message table and a record of how each message was processed by the central computer 201 and each automated check-out unit 203. The trip tables will be deleted automatically after a period of time from the levels below the central computer.

Figure 5:
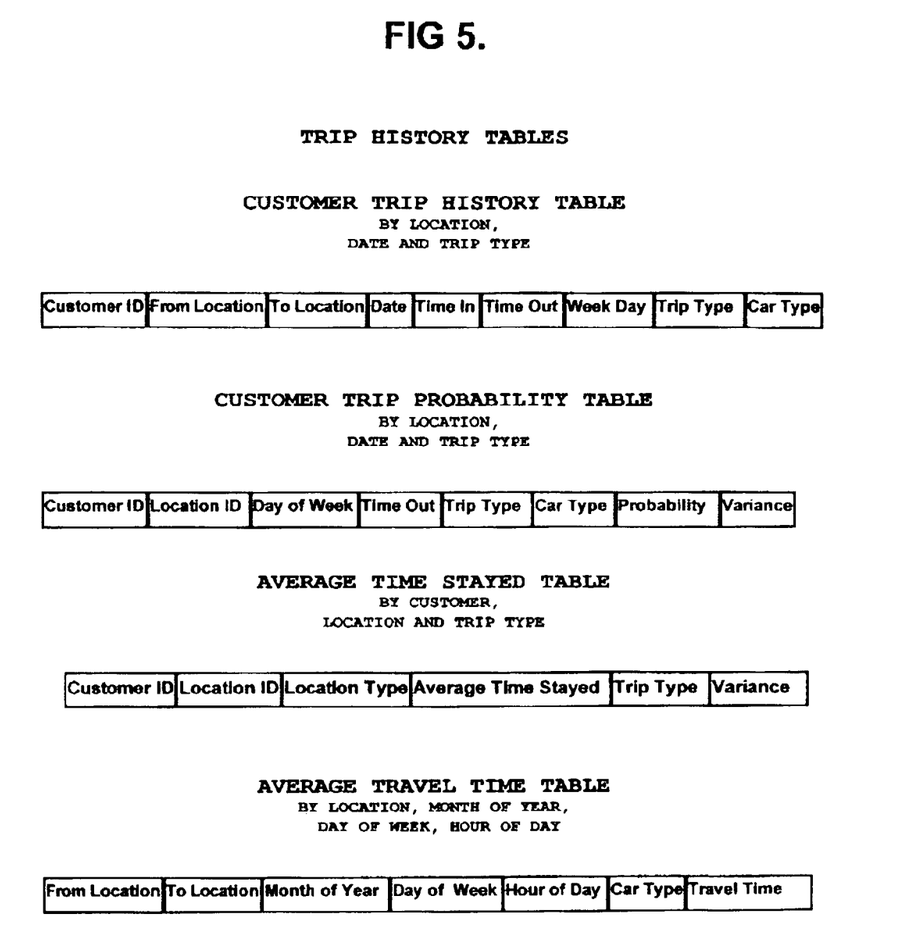
FIG. 5 shows the trip history database tables according to an illustrative embodiment of the present invention.

Next, according to an illustrative embodiment of the present invention, are the Trip History Tables, contained within the central computer system 200. These tables are shown in FIG. 5 The first of these tables is the Customer Trip History Table 500. This table takes the information in the Trip Table 400 and reorganizes according to the customers in the system. This information is then used to prepare the Customer Trip Probability Table 501, which determines a customer's probability for making a trip from the various locations served by the system during various time periods. The Customer Trip Probability Table records data such as the probability that the customer will leave for work every weekday morning between 8:30 AM and 9:00 AM (e.g., 98%); the probability that the customer will need a car at 6:00 PM to come home; the probability that the customer will need a car on Saturday mornings; and the probability that the customer will need a car after midnight on week nights. Of course, these examples are merely to illustrate the types of probabilities that the Customer Trip Probability Table records, and are not intended to limit the possible data contained therein.

Another useful table of data is the Average Time Stayed (in locations other than home) Table 502. This table records the average time a person stays at work, shopping in particular areas, at restaurants, at ballgames, etc. This table is useful in predicting when a person needs a vehicle to leave an area.

Figure 6:
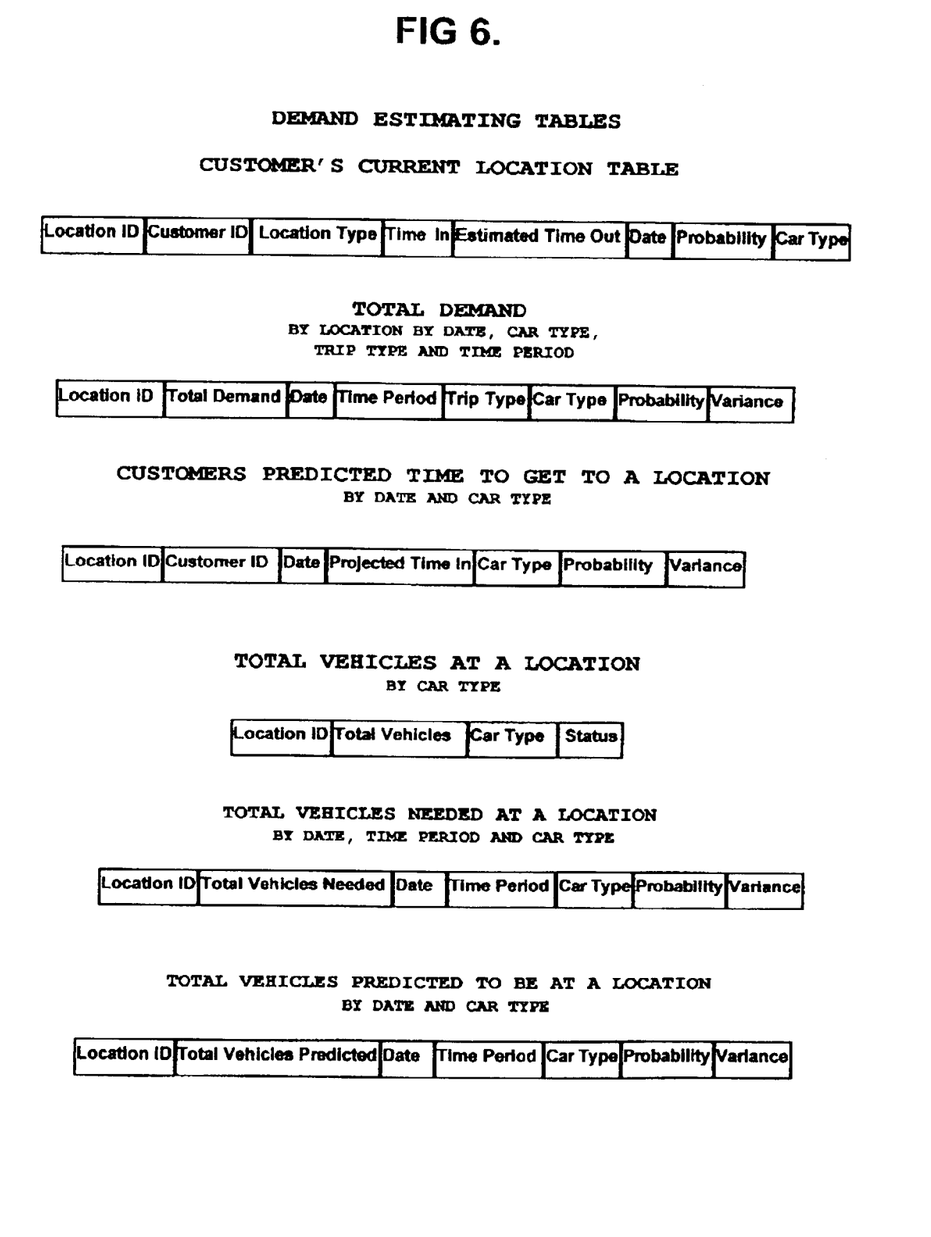
FIG. 6 shows the demand estimating and total vehicle database tables according to an illustrative embodiment of the present invention.

Next, according to an illustrative embodiment of the present invention, are the Demand Estimating Tables shown in FIG. 6. The first of these is the Customer's Current Location Table. As the name implies this table contains the customer's current location. The Customer's Current Location Table is updated every time a customer finishes a trip. If a customer goes to work the record is updated with the customer's work location identification, the estimated time the customer is expected to leave, and the probability of the event. If the customer goes home the record is updated with the next time the customer is expected to leave home, and the probability of the customer's leaving. From this table the Total Demand may be projected by location by summing the individual customer demands and their probability for future time periods. This type of demand estimating process is very dynamic. For example, if there is no one in an area then the estimated demand for that area is zero. If eighty-five people use our vehicles to go to work at 9 AM in an area then their individual average time stayed in an area is used to estimate when eighty-five vehicles will be needed for their trips home.

Another set of database tables, according to an illustrative embodiment of the present invention, is the Vehicle Estimating Tables. The first of these tables is the Total Vehicles at a Location Table. The second of these tables is the Total Vehicles Needed at a Location. This table uses the total demand estimates in the Total Demand Table to project ahead and look at the vehicles needed in the future time periods. The third table in this section is the Customers Predicted to Return Home. A record is added to the Customers Predicted to Return Home table every time a person completes a trip to any location other than his home, and the record is deleted every time a person returns home. The information in this table comes from the Average Time Stayed Table and the Average Travel Time Table. The final table in this section is the Total Vehicles Predicted to be at a Location. This table takes the total vehicles at a location and takes from it the total vehicles needed and adds to it the total vehicles predicted to return for the future time periods. By using the Total Vehicles Predicted to be at a Location table, system personnel can look ahead and spot shortages coming and correct them before they happen by moving vehicles from areas that have an excess number of cars.

For purposes of illustration, and in no way for the purposes of limitation, the following exemplary elements may be used in carrying out the invention. According to the automated checkout unit/cell communications module, 102 and 203, the following hardware may be implemented. In an illustrative embodiment, the automated checkout unit 102 and 203 may incorporate a Gilbarco, Inc., E-crin unit. This unit is a remote point of sale unit, which is conventionally implemented at gas stations. Typically, a unit such as this is run from a personal computer inside the gas station. According to the illustrative embodiment of the present invention, the unit was customized by installing a small PC/104 unit inside the E-crin unit. This small embedded computer (PC/104) has a modulator/demodulator (modem) that is linked to the central computer and wireless modem produced by Freewave Technologies. This modem is in radio contact with another wireless modem in the automobile control units in each of the vehicles. According to the public access automobile system of the present invention, the central computer system 200 is the overall master. The central computer system 200 communicates directly with the cell communications unit 203, and as such, the cell communications unit 203 is the slave of the central computer system 200. When polled by the central computer system 200, cell communications unit 203 sends back messages that it has stored for the central computer system 200 and receives and processes any messages generated by the central computer system 200.

The cell communications unit 105 and 203 is the master of the link between itself and the vehicles 205 at its particular location. This unit relays any messages from the central computer system 200 to the vehicles 205, and also any messages it generates itself, such as general status checks or vehicle checkout instructions. As described previously, the relational databases 204 of the automated checkout units/cell communications units 203 are a subset of the relational database 202 in the central computer 201.

For more positive identification and to prevent fraud associated with credit cards and pin numbers a finger print identification unit will be attached to the automated checkout unit 203. For purposes of illustration, and in no way for the purposes of limitation, this unit could be the MV 1100 produced by Biometric Identification Inc. This unit would fit inside the Gilbarco E-crin and be attached to a serial port of the embedded computer (PC/104).

Below, some examples of checkout transactions according to exemplary embodiments of the present invention are described. These are intended to be illustrative of the invention, and in no way limitive thereof. To wit, it is noted that other transactions and predictions using the methods, databases and apparati described herein will be apparent to one skilled in the art to which the present invention relates, who has had the benefit of a review of this disclosure.

To illustrate a checkout transaction, if a particular customer desires to checkout a vehicle from an unattended parking lot, the following transaction occur:

He enters his identification card into the automated checkout unit (ACU).

The automated checkout unit (ACU) checks in the customer table to see if the identification card is valid.

If the identification card is valid the ACU tells him to enter his password or place his thumb on the thumb reader.

The ACU checks in the customer table to see if the password and fingerprint are valid and his status is eligible.

If this is in order the ACU prompts him for a car type.

Once the customer makes his selection, the ACU checks in the car queue table for the next available car.

The ACU passes a message to the Cell Communications Module (CCM), which in turn sends it to the car to unlock its doors and allow the ignition to operate.

Once the automobile control unit radios back that it has completed these transactions, and updates its database the CCM sends a message to ACU, which informs the customer, which car to use.

The ACU then creates a new trip record and updates the customer's record.

A message is created and sent to the Cell Communications Module (CCM).

When the CCM is polled by the Central Computer System the message is sent to the CCS.

The CCS processes the message. It creates a new trip record and updates the customer's record in its database.

The CCS then sends the message to the other CCM's which in turn passes it to the ACU which in turn updates their copy of the customer's record.

To illustrate another type checkout transaction, if a particular customer desires to checkout a vehicle from an attended parking lot, the following transaction would occur:

He enters his identification card into the automated checkout unit (ACU).

The automated checkout unit (ACU) checks the customer table to see if the identification card is valid.

If it's valid the ACU tells him to enter his password or place his thumb on the thumb reader.

The ACU checks in the customer table to see if the password or finger print is valid and his status is eligible.

If this is in order the ACU prompts him for a vehicle type.

Once the customer makes his selection, the ACU checks to see if a vehicle of that type is available.

If a vehicle is available the ACU passes a message to the Cell Communications Module (CCM), which in turn sends it to all the vehicles of that type to be ready for a trip by that customer.

The customer gives his touch memory device to an attendant who goes to find a vehicle of that type in the garage.

Once the attendant finds a vehicle he puts the touch memory device into the touch memory reader attached to the vehicle control unit (VCU).

The VCU radios back to CCM that it has been selected, and the Cell Communications Module sends a message to the automated checkout unit ACU that updates its database.

The message is maintained in the Cell Communications Module (CCM).

When the CCM is polled by the Central Computer System the message is sent to the CCS.

The CCS processes the message. It creates a new trip record and updates the customer's record in its database.

The CCS then sends the message to other CCM's which in turn passes it to their ACU's which in turn updates their copy of the customer's record.

To illustrate yet another type checkout transaction, if a particular customer desires to checkout a vehicle left parked on the street, the following transaction would occur:

He enters his touch memory device into the touch memory reader attached to the Vehicle Control Unit (VCU).

The VCU checks in its customer table to see if the number on the touch memory device is valid.

If it's valid the VCU tells him to enter his PIN or place his thumb on the thumb reader. This unit may be located either inside or outside the vehicle.

The VCU then checks its copy of the customer table to see if the PIN or finger print is valid and the customer's status is eligible.

If this is in order the VCU allows the customer to operate the vehicle.

The VCU creates a new trip message and sends it to the Cell Communications Unit (CCU) which is an independent unit which isn't connected to an Automated Check-Out Unit.

When the CCU is polled by the Central Computer System the message is sent to the CCS.

The CCS processes the message. It creates a new trip record and updates the customer's record in its database.

The CCS then sends the message to other CCU's and CCM's which in turn passes it to the VCU's in its cell and its ACU if it has one, which in turn updates their copy of the customer's record.

Finally, the vehicle control unit is disposed within each of the vehicles 205. The vehicle control unit (not shown) controls the use a car by way of commands from the automated checkout unit 102 and 203. This unit may reside in a special container built for the vehicles. The vehicle control unit may include a PC/104 computer and a wireless modem. The PC/104 computer may have a relay board that switches off the power to the various automobiles structures, such as door locks, ignition, etc. The software which controls the automated checkout unit runs in a continuous loop waiting for instructions from the automated checkout unit 203,102. When a command is received from the automated checkout unit 102, 203 the commands are carried out and the continuous loop is reinitiated. The vehicle control unit may also may also be used to monitor various car status information, such as fuel levels, and report this back to the automated checkout unit where it can relayed back to the central computer system 200. In the above described embodiments, certain features have been described to illustrate the invention. These features are not intended to be exhaustive or limiting of the present invention. For example, the invention of the above described embodiments includes the active involvement of employees/personnel at a central office to carry out various functions as described herein. To some extent, if and possibly completely, the function of these employees/personnel may be completely automated through appropriate hardware and software implementations. Moreover, the communication between various units may be through a hardwired scenario, or by optical fiber communication. Moreover, and particularly in mobile or remote location structures, the communication vehicle may be via a wireless device, such as a wireless modulator/demodulator. Again, this is intended in no way to be exhaustive, as other techniques for effecting the communication such as wired systems, optical fiber communication systems, as well as cellular telephony, local multipoint distribution systems (LMDS) and satellite communication systems, to name illustrations may be used in various applications as would be readily understood by one having ordinary skill the art. As such, while illustrations above may not have specifically mentioned these during descriptions of a particular embodiment, it is clear that these other types of communications may be incorporated into the above embodiments as would be practical.

As can be appreciated from a review of the above illustrative embodiments, the present invention is realized by implementation of certain systems and methods. Some characteristics of these systems and methods are described presently. All of these characteristics influence the central idea of this patent, namely building a viable alternative to the private vehicle which in turn depends upon building a system with a high degree of availability.

For example, one characteristic of the system and method of the present invention is to control the inflow of customers. To offer a high availability, the system and method of the present invention requires the control of the flow of customers into or out of the car-sharing system. Moreover, customer needs must be ascertained, and the system and method must be selective in matching customers to ensure that their individual demands complement other customers' demands. As such the system and method of the present invention offers a high availability by accurate determination of vehicle demand.

Usefully, the system and method of the present invention places limits on a customer's use. To ensure availability, both minimum and maximum uses must be set for users. These limits can be adjusted to suit each individual customer, some customers can sign-up for more use and some for less use. Some customers can sign-up for use on particular days of the week; others can sign-up for unrestricted use. There can be a good deal of variance or freedom built into the system, like time not used in one period can be accumulated for future use, but the overall limits have to be enforced so that all customers will get the service they expect. In all of these cases, enforcing the limits is done by cost. Ultimately, these features foster accuracy in predicting vehicle demand.

Moreover, the system and method of the present invention control the types of usage. One of the goals in the system and methods of the present invention is to give customers the greatest possible freedom in car use. The problem in this area is that some categories of vehicle travel are inefficient, such as the daily trip to work. The vehicle sits in a parking lot all day and then brings its owner home that night. Car sharing will not improve this situation and it's a very uneconomical car-sharing market. Other categories such as the trip to the grocery store, or weekend trips to out of town are ideally served by car sharing. The trick is not to get too many of the inefficient trips. The basic answer to this situation is to charge more for work trips, which gets back to building a more detailed demand history database. The ideal situation for both the customer and the system is for the system to take care of all of a customer's needs thereby letting the efficient trips balance out the inefficient trips.

The invention having been described in detail in connection through a discussion of exemplary embodiments, it is clear that modifications of the invention will be apparent to one having ordinary skill in the art having had the benefit of the present disclosure. Such modifications and variations are included in the scope of the appended claims.

What is claimed is:

1. A shared-vehicle system, which preserves the freedom and dependability associated with private vehicles, comprising:

an automated checkout unit, which is operatively coupled to at least one vehicle;

a central control center that is adapted to perform control and monitoring function on each of said at least one vehicle, wherein said automated checkout unit is responsive to a member request, and is adapted to enable one of said at least one vehicles for use by a member;

a checkout/return system, which functions throughout a network of checkout/return locations, including both specific sites and zone sites, allowing members to travel between similar or dissimilar types of locations; and a demand projection apparatus that is capable of adapting to a dynamic nature of urban vehicle travel, and which projects vehicle demand to approximately 99% certainty or greater by utilizing both historical and real-time data.

2. A shared-vehicle system as recited in claim 1, further comprising:

a cell communications module operatively coupled to said automated check-out unit, wherein said cell communications module provides communications between said central control center and said at least one vehicle.

3. A shared vehicle system as recited in claim 1, wherein said demand projection apparatus further comprises at least one demand projection module.

4. A shared vehicle system as recited in claim 3, wherein said demand projection apparatus further comprises a user interface module, which is adapted to show ingress and egress of said at least one vehicle, and to compare a number of available vehicles with a projected demand.

5. A shared-vehicle system as recited in claim 1, wherein said demand projection apparatus further comprises at least one relational database; and at least one trip history table database; and at least one demand estimating table, each of which is coupled to said central control center.

6. A shared-vehicle system as recited in claim 1, wherein the system is disposed in an urban setting.

7. A shared-vehicle system that enables authorized members to share a plurality of vehicles located at various types of locations throughout an urban setting while preserving the freedom and dependability associated with private vehicles, comprising:

an automated cheek-out unit operatively coupled to at least one vehicle, said check-out unit being a part of a check-out system which includes diverse types of locations, said cheek-out unit being capable of operating in said diverse types of locations;

a central control center that is adapted to perform control and monitoring functions on each of said at least one vehicle;

a communications module providing communications between said central control center and at least one vehicle for enabling said at least one vehicle in response to a member request;

a demand projection apparatus capable of adapting to a dynamic nature of urban vehicle travel by utilizing both historical and real-time data; and a system for controlling vehicle usage by members, whereby authorized members can check-out vehicles and travel freely throughout an urban setting and between the same location, or between similar or diverse types of locations.

8. A shared-vehicle as recited in claim 8, wherein said demand projection apparatus calculates demand at the individual member level and then summarizes this demand at all check-out locations throughout an urban region thereby ensuring a demand projection capability of approximately 99% or greater.

9. A shared-vehicle system as recited in claim 7, wherein each of said at least one vehicles includes a vehicle control unit.

10. A shared-vehicle system as recited in claim 9, wherein each of said vehicle control units contains a communications module.

11. A shared-vehicle system as recited in claim 7, wherein there are multiple check-out units located throughout an urban region.

12. A shared-vehicle system as recited in claim 9, wherein said automated check-out unit is located in said vehicle control unit.

13. A shared-vehicle system as recited in claim 7, wherein said communications module is composed of at least one cell communications module and a central control center communications module.

14. A shared-vehicle system as recited in claim 13, wherein said cell communications module is operatively connected to said automated check-out unit, whereby said cell communications module provides communications between said central control center and said check-out unit.

15. A shared-vehicle system as recited in claim 13, wherein said cell communications module is operatively coupled to a vehicle in the shared-vehicle system, whereby said cell communications module provides communications between said central control center and said vehicle.

16. A shared-vehicle system as recited in claim 7, wherein said central control center includes a relational database.

17. A shared-vehicle system as recited in claim 9, wherein said vehicle control unit includes a relational database.

18. A shared-vehicle system as recited in claim 11, wherein said multiple check-out units include a relational database.

19. A shared-vehicle system as recited in claim 11, wherein each of said at least one vehicles includes a vehicle control unit; and wherein each of said central control center, multiple check-out units, and vehicle control units include a relational database, and wherein the relational databases in the said multiple check-out units and vehicle control units form a subset of the relational database in the central control center.

20. A shared-vehicle system as recited in claim 7, wherein said demand projection apparatus further comprises a user interface module, which is adapted to show ingress and egress of said at least one vehicle, and to compare a number of vehicles with a projected demand.

21. A shared-vehicle system as recited in claim 7, wherein said demand projection apparatus comprises at least one relational database and a plurality of tables of relevant member and vehicle data, each of which is coupled to said central control center.

22. A shared-vehicle system as recited in claim 7, wherein said diverse types of locations include attended and unattended parking areas, and wherein said check-out system includes check-out units adapted to operate in such locations.

23. A shared-vehicle system as recited in claim 22, wherein said check-out system permits members to check-out vehicles at one type of location and to return the vehicle at the same or different type of location.

24. A shared-vehicle system as recited in claim 22, wherein said check-out units are located both at fixed locations and in vehicle control units, thus allowing members to travel between diverse types of locations.

25. A shared-vehicle system as recited in claim 7, wherein said system for controlling vehicle usage is capable of limiting usage by total time, days of the week or month, or by the number of members in relation to the number of vehicles.

\* \* \* \* \*